(12) United States Patent
Lee (10) Patent No.: US 8,854,699 B2
(45) Date of Patent: Oct. 7, 2014

(54) SCAN MOVEMENT INDICATOR AND AN IMAGE FORMING APPARATUS HAVING THE SAME

(75) Inventor: Sung-kyun Lee, Seoul (KR)

(73) Assignee: Samsung Electronics Co., Ltd, Suwon-si (KR)

(*) Notice: Subject to any disclaimer, the term of this patent is extended or adjusted under 35 U.S.C. 154(b) by 1624 days.

(21) Appl. No.: 11/869,166

(22) Filed: Oct. 9, 2007

(65) Prior Publication Data

US 2008/0218815 A1 Sep. 11, 2008

(30) Foreign Application Priority Data

Mar. 6, 2007 (KR) .................. 10-2007-0021886

(51) Int. Cl.
*H04N 1/04* (2006.01)
*H04N 1/48* (2006.01)
*H04N 1/10* (2006.01)
*H04N 1/00* (2006.01)
*H04N 1/193* (2006.01)

(52) U.S. Cl.
CPC ............. *H04N 1/48* (2013.01); *H04N 1/1017* (2013.01); *H04N 1/0049* (2013.01); *H04N 1/193* (2013.01)

USPC .......................................................... 358/474

(58) Field of Classification Search
USPC .................... 358/1.1, 1.15, 474, 478
See application file for complete search history.

(56) References Cited

U.S. PATENT DOCUMENTS

| 5,883,728 A * | 3/1999 | Kow ............................. 358/494 |
| 6,577,332 B2 * | 6/2003 | Osawa et al. ................. 347/241 |
| 2003/0218689 A1 * | 11/2003 | Angeli et al. ................. 348/370 |

* cited by examiner

*Primary Examiner* — Jeremiah Bryar
(74) *Attorney, Agent, or Firm* — Stanzione & Kim, LLP

(57) ABSTRACT

A scan movement indicator in which light directed toward an indicating unit or external light entering through the indicating unit does not penetrate a scanning area so that improved quality of a scanning and printing operation is provided, and an image forming apparatus having the same are provided. The scan movement indicator includes a light source unit disposed in a scan unit which is movable in a main body of an image forming apparatus, an indicating unit disposed in the main body of the image forming apparatus along a moving direction of the scan unit, and having a portion of the indicating unit that is brightened by light from the light source, and a light blocking unit to block light directed toward the indicating unit or external light entering through the indicating unit from penetrating into a scanning area.

20 Claims, 5 Drawing Sheets

SCAN MOVEMENT INDICATOR AND AN IMAGE FORMING APPARATUS HAVING THE SAME

CROSS-REFERENCE TO RELATED APPLICATIONS

This application claims priority under 35 U.S.C. §119(a) from Korean Patent Application No. 10-2007-0021886, filed in the Korean Intellectual Property Office on Mar. 6, 2007, the entire disclosure of which is incorporated herein in its entirety by reference.

BACKGROUND OF THE INVENTION

1. Field of the Invention

The present general inventive concept relates to an image forming apparatus having a scanning function, and more particularly to a scan movement indicator to show a state of a scanning operation to a user when performing scanning, and an image forming apparatus having the same.

2. Description of the Related Art

In general, image forming apparatuses such as multifunction apparatuses having a scanning function includes a main body having a plate to place documents thereon, a scan unit disposed under the plate to reciprocatively move with respect to the plate, and a cover to cover the plate. The image forming apparatus performs scanning after a document is placed on the plate and the cover is put on the document and covers the plate. As the plate is closed by the cover, a user is not aware of a state of a scanning operation from outside the image forming apparatus. Accordingly, the user has to open the cover in order to check a state of the scanning operation. If the cover is lifted during the scanning operation, a scanning area is exposed to external light so that a quality of the scanned document deteriorates and the user has to scan it again.

Figure 1:
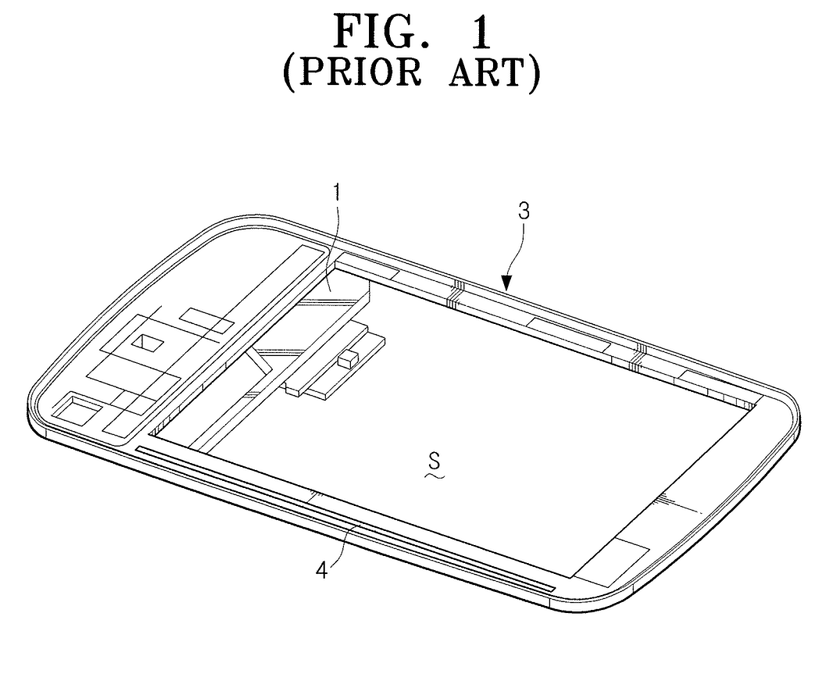
FIG. 1 is a perspective view illustrating an image forming apparatus having a general scan movement indicator.

In order to prevent such problems, general image forming apparatuses have a scan movement indicator that shows the state of the scanning operation to a user. FIG. 1 is a perspective view illustrating an image forming apparatus having a scan movement indicator, and FIG. 2 is an enlarged view illustrating a main part of the scan movement indicator.

Figure 2:
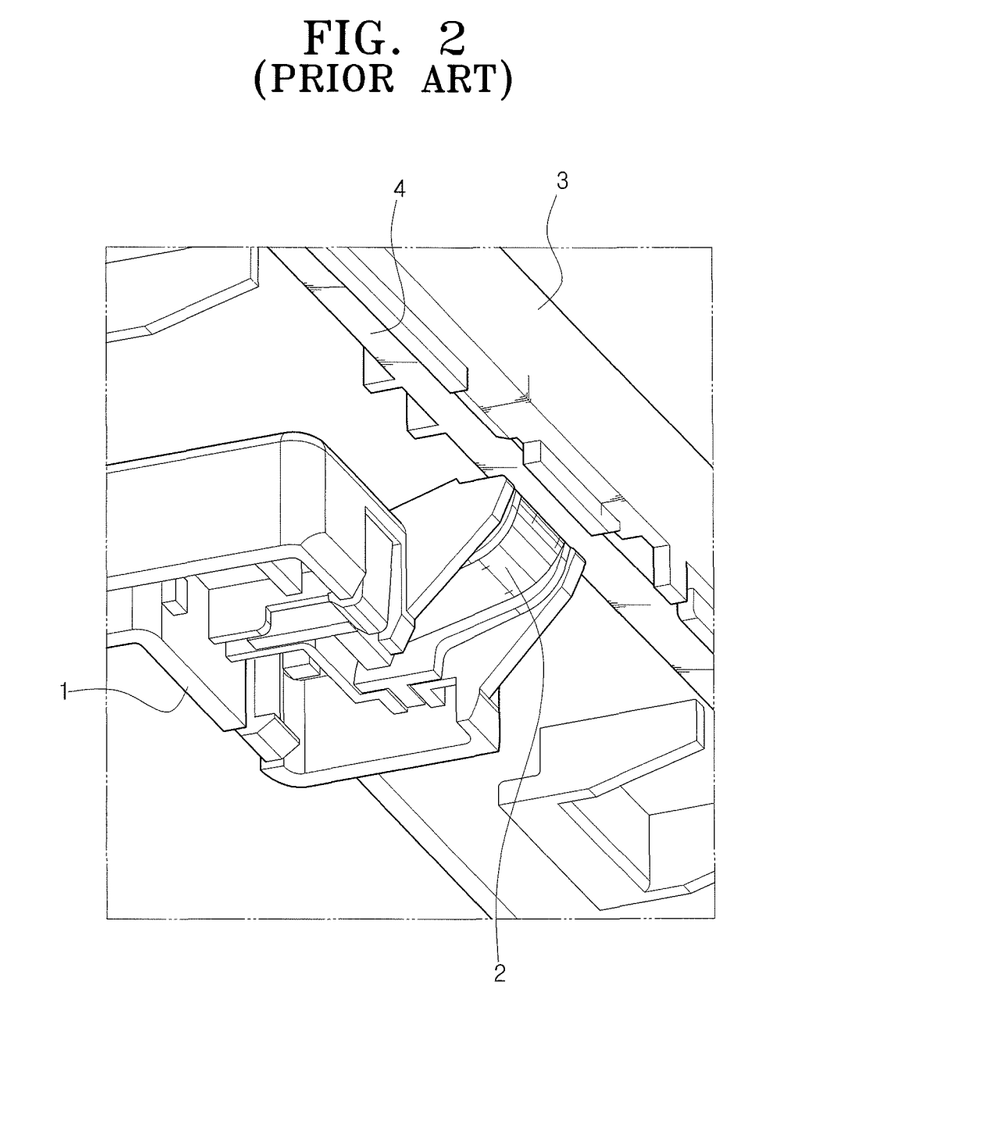
FIG. 2 is an enlarged view illustrating a main portion of a scan movement indicator as illustrated in FIG. 1.

As illustrated in FIGS. 1 and 2, the general scan movement indicator includes a light source unit 2 disposed in the scan unit 1 and an indicating unit 4 disposed on an upper part of the main body 3 of the image forming apparatus along a moving direction of the scan unit 1. The light source unit 2 includes a luminous element such as a light emitting diode (LED), and a light guide member (not illustrated) to guide light emitted from the luminous element to the indicating unit 4.

In a general scan movement indicator having the above configuration, light emitted from the light source unit 2 is projected to the indicating unit 4 so that the state of the scanning operation can be checked from outside the image forming apparatus. As the scan unit 1 moves, light from the light source unit 2 is directed toward a corresponding portion of the indicating unit 4, so that a user can determine the state of the scanning operation by checking a location of the light in the indicating unit 4.

In a general scan movement indicator as described above, however, light directed toward the indicating unit 4 or external light entering through the indicating unit 4 may penetrate a scanning area S, resultantly deteriorating a quality of scanning and printing of a scanning operation. If light penetrates the scanning area S and if the scanning area is exposed to the penetrated light, a portion of a scanned image or printed paper is blacked-out so a user may repeat the scanning.

SUMMARY OF THE INVENTION

The present general inventive concept provides a scan movement indicator in which light directed toward an indicating unit or external light entering through an indicating unit does not penetrate a scanning area so improved quality of scanning and printing is provided, and an image forming apparatus having the same.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a scan movement indicator, including a light source unit disposed in a scan unit movable in a main body of an image forming apparatus, an indicating unit disposed in the main body of the image forming apparatus along a moving direction of the scan unit, and having a portion that is brightened by light from the light source, and a light blocking unit to block light directed toward the indicating unit or external light entering through the indicating unit from penetrating into a scanning area.

The light blocking unit may include a light blocking rib disposed inside the indicating unit of the main body of the image forming apparatus along a length of the indicating unit.

The light source unit may include a light radiating element such as a light emitting diode (LED) and a light guide member to guide light from the light radiating element to the indicating unit.

The indicating unit may include a diffusion lens to diffuse light.

The indicating unit may be disposed on an upper portion of the main body of the image forming apparatus.

The foregoing and/or other aspects and utilities of the present general inventive concept may also be achieved by providing an image forming apparatus, including a main body having a plate to receive a document, a cover to cover the plate of the main body, a scan unit disposed under the plate to reciprocatively move with respect to the plate, a light source unit disposed in the scan unit, an indicating unit disposed on the main body of the image forming apparatus along a moving direction of the scan unit, and having a portion that is brightened by light from the light source and a light blocking unit to block light directed toward the indicating unit or external light entering through the indicating unit from penetrating into a scanning area.

The foregoing and/or other aspects and utilities of the general inventive concept may also be achieved by providing an image forming apparatus, including a main body, a plate having a scanning area to be used in a scanning operation, an indicating unit disposed on the main body to indicate a level of completion of the scanning operation and a light blocking unit to block unwanted light from interfering with the scanning area of the plate during the scanning operation.

The foregoing and/or other aspects and utilities of the general inventive concept may also be achieved by providing an image forming apparatus, including a main body, a plate to receive a document to be used in a scanning operation, an indicating unit disposed on the main body to indicate a level of completion of the scanning operation and a light blocking unit to block light directed toward the indicating unit and external light entering through the indicating unit from penetrating into a scanning area of the plate during the scanning operation.

The foregoing and/or other aspects and utilities of the general inventive concept may also be achieved by providing an image forming apparatus, including a scan unit having a light source to perform a scanning operation, a plate disposed above the scan unit to receive a document to be used in the scanning operation, a cover to cover the plate during the scanning operation, an indicating unit having indicating unit portions correspond to plate portions along a length of the plate so that illumination of the respective indicating light portion by the light source indicates a position of the scan unit during the scanning operation and a light blocking unit to block light directed toward the indicating unit and external light entering through the indicating unit from penetrating into a scanning area of the plate.

The foregoing and/or other aspects and utilities of the general inventive concept may also be achieved by providing a method of indicating a level of completion of a scanning operation in an image forming apparatus, the method includes providing an indicating unit having indicating unit portions respectively corresponding to positions of a scan unit during the scanning operation, illuminating the respective indicating unit portion corresponding to the respective position of the scan unit by the scan unit and blocking unwanted light from interfering with a scanning area during the scanning operation.

The foregoing and/or other aspects and utilities of the general inventive concept may also be achieved by providing a method of indicating a level of completion of a scanning operation in an image forming apparatus, the method includes providing an indicating unit having indicating unit portions respectively corresponding to positions of a scan unit during the scanning operation, illuminating the respective indicating unit portion corresponding to the respective position of the scan unit by the scan unit and a light blocking unit to block light directed toward the indicating unit and external light entering through the indicating unit from penetrating into a scanning area of the plate during the scanning operation.

The foregoing and/or other aspects and utilities of the general inventive concept may also be achieved by providing a computer-readable recording medium having embodied thereon a computer program to execute a method, the method includes providing an indicating unit having indicating unit portions respectively corresponding to positions of a scan unit during the scanning operation, illuminating the respective indicating unit portion corresponding to the respective position of the scan unit by the scan unit and blocking unwanted light from interfering with a scanning area during the scanning operation.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
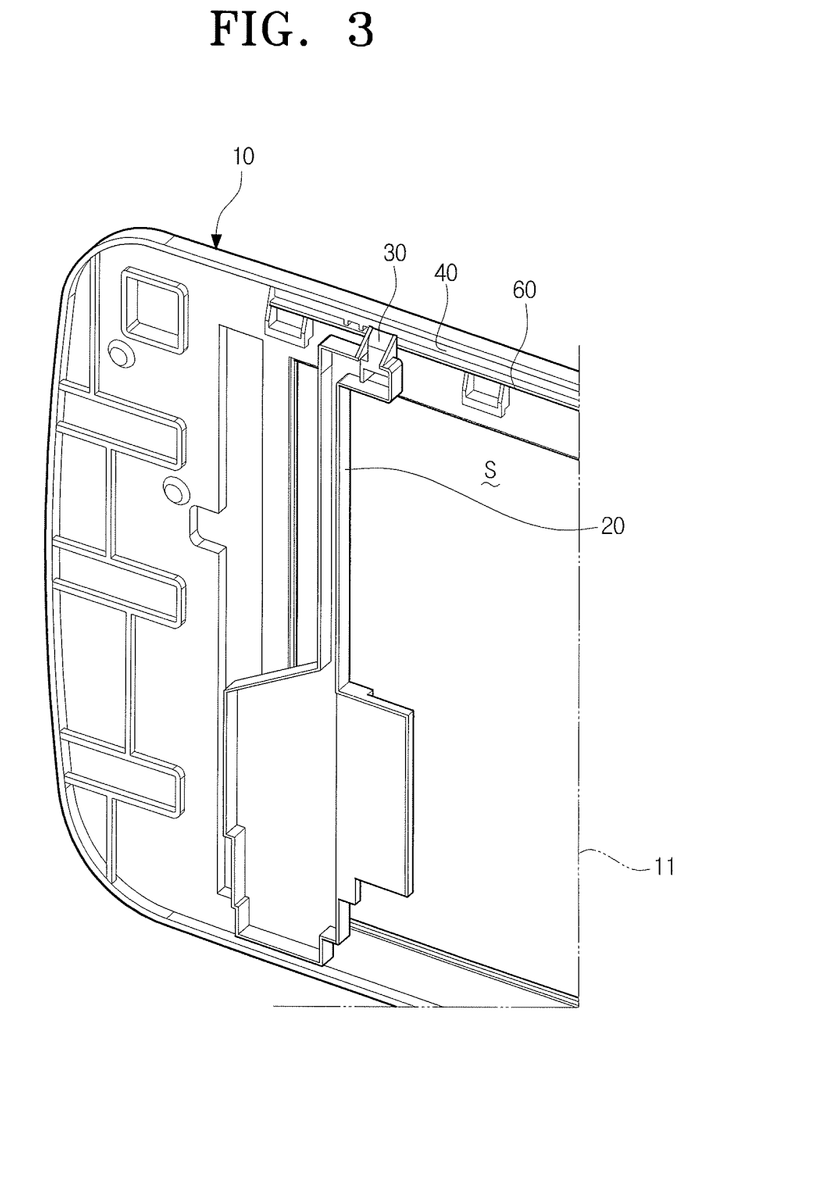
FIG. 3 is a perspective view illustrating a scan movement indicator according to an examplary embodiment of the present general inventive concept.
Figure 4:
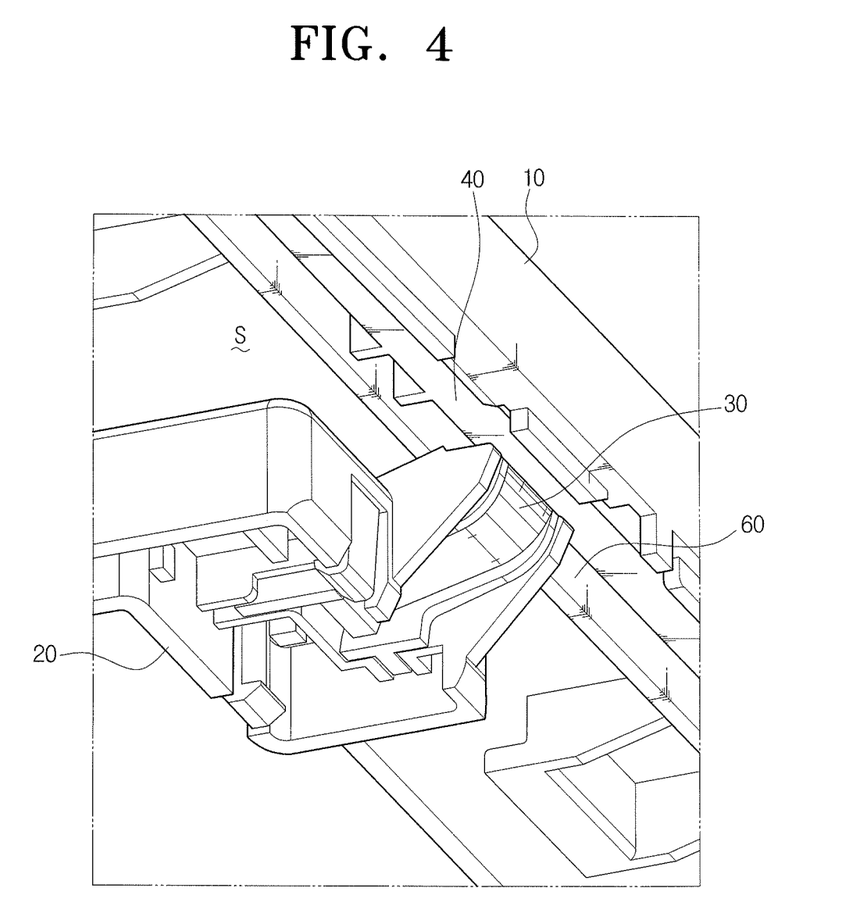
FIG. 4 is an enlarged view illustrating the main portion of a scan movement indicator as illustrated in FIG. 3.
Figure 5:
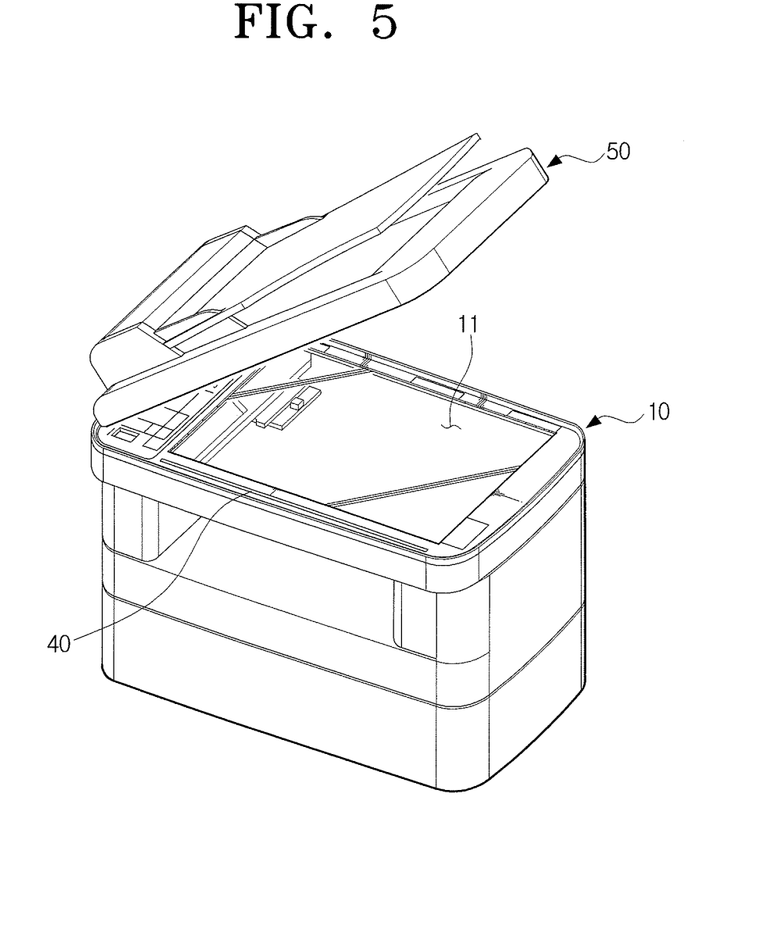
FIG. 5 is a perspective view illustrating an image forming apparatus that includes a scan movement indicator according to an examplary embodiment of the present general inventive concept.

FIGS. 3 to 5 are perspective views illustrating a scan movement indicator according to an examplary embodiment of the present general inventive concept and an image forming apparatus having the same. As illustrated in FIGS. 3 to 5, the main body of the image forming apparatus 10 has a plate 11 to place a document thereon. A scan unit 20 is disposed under the plate 11 to reciprocate along a length of the plate 11 by a driving unit that is not illustrated in the drawings. The scan unit 20 includes a contact image sensor (CIS) and a CIS holder.

A light source unit 30 is disposed in the scan unit 20, and includes a luminous element such as a LED, and a light guide member (not illustrated) to guide light emitted from the luminous element to an indicating unit 40. A cylindrical-type lens is widely used as the light guide member. The light guide member may have a convex light emitting surface to concentrate light on the indicating unit 40 without scattering the light when guiding the light from the light source unit 30 to the indicating unit 40. The LED is mounted on a substrate (not illustrated) disposed on the scan unit 20, and emits light during the scanning operation. A light source is not limited to the LED, and any type of element that generates light during the scanning operation can be used as a light source.

The indicating unit 40 is disposed at a front portion of an upper surface of the main body 10 of the image forming apparatus along a length of the plate 11. The indicating unit 40 shows a moving position of the scan unit 20 as the light of the light source unit 30 brightens a corresponding portion of the indicating unit 40. Accordingly, a user can determine a degree to which the scanning operation is complete with the cover 50 closed, by checking on the indicating unit 40. The indicating unit 40 may include a diffusion lens that diffuses light. Light that is faintly diffused to some extent, for example, from a portion of the indicating unit 40 receiving the light, may be at least more visually pleasing to a user than watching a sharp point of light moving along the indicating unit 40.

In an examplary embodiment, the indicating unit 40 includes a plurality of indicating unit portions disposed along a length of the indicating unit 40. The plate 11 includes a plurality of plate portions including a start plate portion and a stop plate portion disposed along the length of the plate 11. Each of the plurality of indicating unit portions may correspond to each of the plurality of plate portions, respectively. Further, the scan unit 20 including the light source unit 30 moves along the length of the plate 11 during a scanning operation. The scanning operation includes the scan unit 20 starting from the start plate portion and ending at the stop plate portion while the light source unit 30 emits light. The light is directed towards the plate 11 to perform the scanning operation and toward the indicating unit 40 to respectively illuminate a respective indicating unit portion corresponding to the respective plate portion corresponding to a position of the scan unit 40.

In an examplary embodiment, the indicating unit 40 includes a plurality of demarcations (not illustrated) corresponding to various levels of completion of the scanning operation. For example, a first demarcation such as a numeral one may be placed at a respective indicating unit portion corresponding to the start plate portion that represents the start level of the scanning operation, a middle demarcation such as a numeral fifty may be placed at a respective indicating unit portion corresponding to a midway plate portion that represents the midway level (fifty percent scanning operation completion) of the scanning operation, and the last demarcation such as a numeral one hundred may be placed at a respective indicating unit portion corresponding to the stop plate portion that represents the end level of the scanning operation.

Light directed toward the indicating unit 40, which indicates the state of the scanning operation with the cover 50 closed, or external light should not penetrate a scanning area S through the indicating unit 40. As previously mentioned, such light may negatively impact the scanning operation. Accordingly, the indicating unit 40 of an embodiment of the present general inventive concept includes a light blocking unit 60 to block light directed towards the indicating unit 40 or external light from penetrating the scanning area S.

The light blocking unit 60 includes a light blocking rib disposed along a length inside the indicating unit 40 of the main body 10 of the image forming apparatus. The scanning area S and the indicating unit 40 are isolated from each other by the light blocking rib 60 so that light directed toward the indicating unit 40 or external light cannot penetrate the scanning area S through the indicating unit 40. Consequently, the quality degradation of the scanning and printing during the scanning operation due to external light is prevented.

A printing unit (not illustrated) may be mounted inside the main body 10 of the image forming apparatus in order to receive a scanning signal and output an image onto a printing medium.

In the image forming apparatus having the above configuration according to examplary embodiments of the present general inventive concept, in order to perform scanning, a user opens the cover 50, puts a document onto the plate 11 and closes the cover 50. If the user presses a scan starting button, the scan unit 20 scans the document placed on the plate 11 by moving along the length of the plate 11. At the same time, the light source unit 30 in the scan unit 20 emits light, and the light is directed toward the indicating unit 40, with a portion of the indicating unit 40 corresponding to the moving position of the scan unit 20 being illuminated. Accordingly, by identifying the bright portion of the indicating unit 40, the user can easily determine that the scanning has been initiated and also identify a degree of completion of the scanning operation.

Furthermore, because the indicating unit 40 and the scanning area are isolated from each other by the light blocking unit 60, light directed toward the indicating unit 40 cannot penetrate the scanning area. In addition, external light, which may enter through the indicating unit 40, is blocked by the light blocking unit 60, so that the light cannot penetrate the scanning area. As a result, the shortcomings of a conventional image forming apparatus, such as the quality degradation of scanning and printing due to the light directed towards the indicating unit 40 or the external light during a scanning operation, can be prevented.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As can be appreciated from the above description, because light directed toward the indicating unit 40 or external light entering through the indicating unit 40 is blocked by the light blocking rib 60 and does not penetrate a scanning area S, the problem of deteriorating the quality of scanning and printing can be solved. Therefore, an image forming apparatus according to various embodiments of the present general inventive concept that has product reliability and customer satisfaction can be provided.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A scan movement indicator, comprising:
a light source unit disposed in a scan unit movable in a main body of an image forming apparatus;
an indicating unit disposed in the main body of the image forming apparatus along a moving direction of the scan unit, and having a portion of the indicating unit that is brightened by light from the light source unit; and
a light blocking unit disposed along the moving direction of the scan unit to block light directed toward the indicating unit or external light entering through the indicating unit from penetrating into a scanning area, such that the light blocking unit extends outward from the indicating unit in a direction toward the light source unit.

2. The scan movement indicator of claim 1, wherein the light blocking unit comprises:
a light blocking rib disposed inside the indicating unit of the main body of the image forming apparatus along a length of the indicating unit.

3. The scan movement indicator of claim 1, wherein the light source unit comprises:
a light radiating element; and
a light guide member to guide light from the light radiating element to the indicating unit.

4. The scan movement indicator of claim 1, wherein the indicating unit comprises:
a diffusion lens to diffuse light.

5. The scan movement indicator of claim 1, wherein the indicating unit is disposed on an upper portion of the main body of the image forming apparatus.

6. An image forming apparatus, comprising:
a main body having a plate to receive a document;
a cover to cover the plate of the main body;

a scan unit disposed under the plate to reciprocatively move with respect to the plate;

a light source unit disposed in the scan unit;

an indicating unit disposed on the main body of the image forming apparatus along a moving direction of the scan unit, and having a portion that is brightened by light from the light source unit; and a light blocking unit disposed along the moving direction of the scan unit to block light directed toward the indicating unit or external light entering through the indicating unit from penetrating into a scanning area, such that the light blocking unit extends outward from the indicating unit in a direction toward the light source unit.

7. The image forming apparatus of claim 6, wherein the light blocking unit comprises:

a light blocking rib disposed inside the indicating unit of the main body of the image forming apparatus along a length of the indicating unit.

8. The image forming apparatus of claim 6, wherein the light source unit comprises:

a light radiating element; and a light guide member to guide light from the light radiating element to the indicating unit.

9. The image forming apparatus of claim 6, wherein the indicating unit comprises:

a diffusion lens to diffuse light.

10. The image forming apparatus of claim 6, wherein the indicating unit is disposed on an upper portion of the main body of the image forming apparatus.

11. An image forming apparatus, comprising:

a main body;

a plate having a scanning area to be used in a scanning operation;

an indicating unit disposed on the main body to indicate a level of completion of the scanning operation; and a light blocking unit disposed along a scan unit moving direction to block light from interfering with the scanning area of the plate during the scanning operation, such that the light blocking unit extends outward form the indicating unit in a direction toward the plate.

12. The image forming apparatus of claim 11, further comprising:

a scan unit to move along a length of the plate during the scanning operation.

13. The image forming apparatus of claim 12, wherein the indicating unit is disposed along the length of the plate and has indicating unit portions that correspond with plate portions.

14. The image forming apparatus of claim 12, wherein the indicating unit indicates the level of completion of the scanning operation by the respective portion of the indication unit being illuminated by the scan unit.

15. The image forming apparatus of claim 11, wherein the indicating unit comprises:

a plurality of demarcations corresponding to various levels of completion of the scanning operation.

16. An image forming apparatus, comprising:

a main body;

a plate to receive a document to be used in a scanning operation;

an indicating unit disposed on the main body to indicate a level of completion of the scanning operation; and a light blocking unit dispose along a scan unit moving direction to block light directed toward the indicating unit and external light entering through the indicating unit from penetrating into a scanning area of the plate during the scanning operation, such that the light blocking unit extends outward from the indicating unit in a direction toward the plate.

17. An image forming apparatus, comprising:

a scan unit having a light source to perform a scanning operation;

a plate disposed above the scan unit to receive a document to be used in the scanning operation;

a cover to cover the plate during the scanning operation;

an indicating unit having indicating unit portions correspond to plate portions along a length of the plate so that illumination of the respective indicating light portion by the light source indicates a position of the scan unit during the scanning operation; and a light blocking unit disposed along a moving direction of the scan unit to block light directed toward the indicating unit and external light entering through the indicating unit from penetrating into a scanning area of the plate, such that the light blocking unit extends outward from the indicating unit in a direction toward the plate.

18. A method of indicating a level of completion of a scanning operation in an image forming apparatus, the method comprising:

providing an indicating unit having indicating unit portions respectively corresponding to positions of a scan unit during the scanning operation;

illuminating the respective indicating unit portion corresponding to the respective position of the scan unit by the scan unit; and blocking light from interfering with a scanning area during the scanning operation using a light blocking unit disposed along a moving direction of the scan unit, such that the light blocking unit extends outward from the indicating unit in a direction toward the scan unit.

19. A method of indicating a level of completion of a scanning operation in an image forming apparatus, the method comprising:

providing an indicating unit having indicating unit portions respectively corresponding to positions of a scan unit during the scanning operation;

illuminating the respective indicating unit portion corresponding to the respective position of the scan unit by the scan unit; and block light directed toward the indicating unit and external light entering through the indicating unit from penetrating into a scanning area of the plate during the scanning operation using a light blocking unit disposed along a moving direction of the scan unit, such that the light blocking unit extends outward form the indicating unit in a direction toward the scan unit.

20. A computer-readable recording medium having embodied thereon a computer program to execute a method, wherein the method comprises:

providing an indicating unit having indicating unit portions respectively corresponding to positions of a scan unit during the scanning operation;

illuminating the respective indicating unit portion corresponding to the respective position of the scan unit by the scan unit; and blocking light from interfering with a scanning area during the scanning operation using a light blocking unit dispose along a moving direction of the scan unit, such that the light blocking unit extends outward from the indicating unit in a direction toward the scan unit.

* * * * *

UNITED STATES PATENT AND TRADEMARK OFFICE
CERTIFICATE OF CORRECTION

PATENT NO.        : 8,854,699 B2                                              Page 1 of 1
APPLICATION NO.   : 11/869166
DATED             : October 7, 2014
INVENTOR(S)       : Sung-kyun Lee et al.

It is certified that error appears in the above-identified patent and that said Letters Patent is hereby corrected as shown below:

In the Claims

Column 7, line 39, in Claim 11, delete "form" and insert -- from --, therefor.
Column 7, line 63, in Claim 16, delete "dispose" and insert -- disposed --, therefor.
Column 8, line 44, in Claim 19, delete "block" and insert -- blocking --, therefor.
Column 8, line 49, in Claim 19, delete "form" and insert -- from --, therefor.
Column 8, line 51, in Claim 20, after "A" insert -- non-transitory --.
Column 9, lines 61-62, in Claim 20, delete "dispose" and insert -- disposed --, therefor.

Signed and Sealed this
Second Day of June, 2015

Michelle K. Lee
*Director of the United States Patent and Trademark Office*